United States Patent
An et al.

(10) Patent No.: US 9,470,140 B2
(45) Date of Patent: Oct. 18, 2016

(54) ELECTRIC SUPERCHARGER, ASSEMBLING METHOD OF THE SAME, AND INTERNAL COMBUSTION ENGINE

(75) Inventors: Byeongil An, Tokyo (JP); Motoki Ebisu, Tokyo (JP); Hiroshi Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/122,118

(22) PCT Filed: Jul. 5, 2012

(86) PCT No.: PCT/JP2012/067147
§ 371 (c)(1),
(2), (4) Date: Dec. 16, 2013

(87) PCT Pub. No.: WO2013/011839
PCT Pub. Date: Jan. 24, 2013

(65) Prior Publication Data
US 2014/0090626 A1 Apr. 3, 2014

(30) Foreign Application Priority Data
Jul. 15, 2011 (JP) .................................. 2011-157237

(51) Int. Cl.
*F02B 33/44* (2006.01)
*F04B 17/00* (2006.01)
(Continued)

(52) U.S. Cl.
CPC .............. *F02B 33/40* (2013.01); *F02B 39/00* (2013.01); *F02B 39/10* (2013.01);
(Continued)

(58) Field of Classification Search
CPC ........ F02B 33/40; F02B 39/00; F02B 39/10; F04D 25/0606; F16C 39/02; F16C 27/066; F16C 27/00; H02K 5/1732
USPC ................ 60/605.3; 417/410.1, 411, 423.12; 290/52; 310/12.31, 90; 384/49, 50
See application file for complete search history.

(56) References Cited

U.S. PATENT DOCUMENTS 5,022,039 A * 6/1991 Karube et al. .................. 372/58
7,911,101 B2 * 3/2011 Kimura et al. ................. 310/93
(Continued)

FOREIGN PATENT DOCUMENTS

EP  2 241 740 A1  10/2010
JP  10-9268 A     1/1998
(Continued)

OTHER PUBLICATIONS

Decision to Grant a Patent for JP Application No. 2011-157237 draft dated Mar. 19, 2014.
(Continued)

*Primary Examiner* — Nicholas J Weiss
*Assistant Examiner* — Ngoc T Nguyen
(74) *Attorney, Agent, or Firm* — Birch, Stewart, Kolasch & Birch, LLP

(57) ABSTRACT

It is intended to implement an electric supercharger that has a simplified architecture, is easy to assemble, produces reduced vibration and noise, and has a motor inverter, making it possible to minimize losses in motor output and rotary-shaft output. The electric supercharger is provided with the following: an integrated housing with a built-in electric motor and motor inverter; and a ball bearing and damper-sleeve structure arranged on both sides of the electric motor. The damper-sleeve structure comprises a large-diameter sleeve, a spring guide, a coil spring, and a ball bearing. A gap is formed between the ball bearings and a sleeve and the large-diameter sleeve. The inner ring or outer ring of the ball bearings are supported by various support members disposed on both sides. An elastic O-ring that elastically supports the sleeve and large-diameter sleeve is provided on the outside of the sleeves.

10 Claims, 5 Drawing Sheets

(51) Int. Cl.

| | | |
|---|---|---|
| *F02B 33/40* | (2006.01) | |
| *H02K 5/173* | (2006.01) | |
| *H02K 7/14* | (2006.01) | |
| *F04D 25/06* | (2006.01) | |
| *F04D 29/059* | (2006.01) | |
| *F04D 29/66* | (2006.01) | |
| *F02B 39/00* | (2006.01) | |
| *F02B 39/10* | (2006.01) | |
| *F16C 39/02* | (2006.01) | |
| *F16C 19/06* | (2006.01) | |
| *F16C 27/06* | (2006.01) | |

(52) U.S. Cl.
CPC ....... *F04D 25/0606* (2013.01); *F04D 29/059* (2013.01); *F04D 29/668* (2013.01); *F16C 19/06* (2013.01); *F16C 27/066* (2013.01); *F16C 39/02* (2013.01); *H02K 5/1732* (2013.01); *H02K 7/14* (2013.01); *H02K 11/33* (2016.01); *Y10T 29/49012* (2015.01)

(56) References Cited

U.S. PATENT DOCUMENTS

| | | | |
|---|---|---|---|
| 2005/0193738 A1 | 9/2005 | Hayasaka et al. | |
| 2005/0206254 A1* | 9/2005 | Tsuge et al. | 310/68 B |
| 2005/0287018 A1 | 12/2005 | Mavrosakis | |
| 2009/0110572 A1 | 4/2009 | Meacham et al. | |
| 2011/0067679 A1 | 3/2011 | Hitomi et al. | |

FOREIGN PATENT DOCUMENTS

| | | |
|---|---|---|
| JP | 2002-369474 A | 12/2002 |
| JP | 2005-90403 A | 4/2005 |
| JP | 2005-114025 A | 4/2005 |
| JP | 2005-147079 A | 6/2005 |
| JP | 2005-163643 A | 6/2005 |
| JP | 2005-201092 A | 7/2005 |
| JP | 2005-220822 A | 8/2005 |
| JP | 2005-240978 A | 9/2005 |
| JP | 2006-9685 A | 1/2006 |
| JP | 2007-270651 A | 10/2007 |
| JP | 2008-63991 A | 3/2008 |
| JP | 2008-82216 A | 4/2008 |
| JP | 2010-223077 A | 10/2010 |
| JP | 2010-236429 A | 10/2010 |
| JP | 2011-7107 A | 1/2011 |
| JP | 2011-21561 A | 2/2011 |
| JP | 2011-32880 A | 2/2011 |
| JP | 2011-122597 A | 6/2011 |
| WO | WO 2009/125653 A1 | 10/2009 |

OTHER PUBLICATIONS

International Preliminary Report on Patentability (Forms PCT/IB/338 and PCT/IB/326 and PCT/IDS/237).

Extended European Search Report dated May 4, 2015, for European Application No. 12814371.6.

Chinese Notice of Allowance, dated Jun. 16, 2016, for Chinese Application No. 201280028640.2, together with an English translation thereof.

\* cited by examiner

Related Art

ELECTRIC SUPERCHARGER, ASSEMBLING METHOD OF THE SAME, AND INTERNAL COMBUSTION ENGINE

TECHNICAL FIELD

The present invention relates to an electric supercharger which is, for instance, mounted on a vehicle and is driven by an electric motor, an assembling method of the same and an internal combustion engine in which the electric supercharger is installed.

BACKGROUND ART

In a vehicle, a turbocharger equipped with a compressor and a turbine are provided in an intake passage and an exhaust passage, respectively, to improve thermal efficiency of an internal combustion engine. In recent years, as one means to improve turbo lag and responsiveness of the turbocharger, the electric supercharger driven by the electric motor has attracted attention. However, the electric supercharger has many challenges in durability, ease of assembly and ease of installation at the time of installation to the vehicle.

From the viewpoint of reducing axial vibration, the electric supercharger is normally supported at both ends of a motor rotor, which is heavy in weight. The electric supercharger of this two end support method is disclosed in Patent Document 1. In reference to FIG. 8, this supporting method is described. A housing of the electric supercharger 100A is composed of a compressor housing 102, a motor housing 104 and bearing housings 106a and 106b provided on both sides of the motor housing 104. In the compressor housing 102, a compressor wheel 108 is accommodated. A rotation shaft 110 extends toward the motor housing 104 from the center of the compressor wheel 108.

A motor rotor 112 is attached to the rotating shaft 110. A stator (not shown) is provided inside the motor housing 104. The stator is disposed at a position facing the motor rotor 112. Inside the bearing housings 106a and 106b, bearings 114 for supporting the rotating shaft 110 are provided on both sides of the motor housing 104. An inlet 102a of the compressor housing 102 is connected to an intake passage of the internal combustion engine, and by rotation of the compressor wheel 108, supply air a is drawn into the compressor wheel 108 to compress and discharge the supply air a to the outlet side of the intake passage.

FIG. 9 illustrates an electric supercharger 100B for supporting the rotation shaft 110 by one end. In the electric supercharger 100B, a bearing housing 106 is provided between the motor housing 104 and the compressor housing 102. A plurality of bearings 114 is provided inside the bearing housing 106 so as to support the rotation shaft 110 by these bearings 114.

CITATION LIST

Patent Document

[Patent Document 1]
JP 2002-369474 A

SUMMARY

Technical Problem

The electric motor can be supported in a stable fashion by the electric supercharger of two end supporting type for supporting the electric motor by both ends. This is effective in reducing vibration, but assembly thereof is complicated as the bearings are provided on both sides of the electric motor. In contrast, the electric supercharger of single end supporting type is easy to assemble compared with the electric supercharger of two end supporting type. However, it is not advantageous from the point of view of vibration reduction.

Further, in the electric supercharger of Patent Document 1, the motor inverter for controlling the rotation speed of the electric motor is provided at a position away from the motor housing. In this isolated arrangement, it is advantageous from the viewpoint of the ease of assembly and ease of installation to the vehicle. However, as the distance between the electric motor and the motor inverter increases, the current resistance passing through between the electric motor and the motor inverter increases. Therefore, loss of the current flowing through between the electric motor and the motor inverter increases, and the motor output is reduced. Especially with limited power generation capacity of a power generating apparatus installed in the vehicle, reduction in the motor output is disadvantageous in terms of performance.

As the rotation speed of the electric motor increases, the unbalanced load applied to the rotation shaft and the influence of the magnetic attraction force of the electric motor increases. Therefore, there is a problem that, as vibration generated in the rotation shaft becomes larger, the output of the rotation shaft declines and the noise becomes louder.

In view of the problems of the related art, it is an object of the present invention to realize an electric supercharger and an assembling method thereof, which make it possible to simplify the construction, facilitate the assembling, reduce vibration and noise, and, when provided with a motor inverter, suppress the output loss of the motor and the rotation shaft.

Solution to Problem

To achieve the above object, an electric supercharger according to embodiments of the present invention comprises: a compressor wheel housed in a compressor housing; an electric motor for driving a rotation shaft of the compressor wheel; a motor inverter for controlling rotation speed of the rotation shaft, the motor inverter being arranged adjacent to the electric motor in series on the rotation shaft; a rolling bearing provided on each side of the electric motor to rotatably support the rotation shaft; a sleeve provided outside the rolling bearing and forming a gap between the sleeve and the rolling bearing; a supporting portion clamping an outer ring or inner ring of the rolling bearing from both sides to support the rolling bearing; and a damper mechanism arranged outside the sleeve to elastically support the sleeve.

In the electric supercharger of the embodiments of the present invention, the motor inverter is arranged adjacent to the electric motor in series on the rotation shaft and thus, it is possible to minimize electric current loss between the electric motor and the motor inverter. Further, in addition to the vibration reduction effect by supporting the electric motor by both ends thereof, the gap is formed between the rolling bearing and the sleeve provided outside the rolling bearing and thus, it is possible to absorb thermal expansion of the rolling bearing and cut off vibration of the rotation shaft, thereby preventing transmission of the vibration from the rotation shaft to the electric motor and the inverter. In addition, by forming the gap, it is possible to suppress eccentric load generated in the rotation shaft and the rolling bearing. Thus, it is possible to lower cost and simplify the device configuration and it is also possible to suppress the reduction in the output of the rotation shaft.

Further, by providing the damper mechanism outside the sleeve to elastically support the sleeve, it is possible to suppress transmission of the vibration to the electric motor and the inverter. Further, by clamping the outer ring or inner ring of the rolling bearing from both sides to support the rolling bearing, it is possible to fix the rolling bearing in a stable fashion. Thus, a thrust force applied to the rotation shaft from the compressor wheel or the like can be received by the rolling bearing in a stable fashion. This contributes to reduction of vibration and noise, simplification of the device configuration and cost reduction.

In the above electric supercharger, the rolling bearing may comprise a grease enclosed rolling bearing. As the rolling bearing is configured by a grease enclosed rolling bearing, it is no longer necessary to provide a device such as a lubricating oil piping for supplying the lubricating oil to the rolling bearing and thus, it is possible to simplify the configuration of the electric supercharger and lower its cost.

In the above electric supercharger, the damper mechanism may comprise a damper member having elasticity, the damper member being provided in a gap between the sleeve and an inner surface of a housing facing the sleeve. With this configuration, it is possible to realize simple and low-cost damper mechanism.

In the above electric supercharger, the damper mechanism may be configured so that an oil film of lubricating oil is formed in a gap between the sleeve and an inner surface of a housing facing the sleeve. By forming the oil film of lubricating oil, it is possible to realize the long-life damper mechanism whose damper member does not age.

In the above electric supercharger, the rolling bearing arranged on a motor inverter side and the sleeve arranged on an outer side of the rolling bearing may comprise a damper sleeve structure. The damper sleeve structure may comprise: a large diameter sleeve having a pair of inward engagement portions which projects inwardly from each ends; a cylindrical spring guide provided inside the large diameter sleeve and having an outward engagement portion which projects outward from one end; the rolling bearing arranged inside the large diameter sleeve and forming the gap between the large diameter sleeve and the rolling bearing, the rolling bearing being clamped between one of the inward engagement portions of the large diameter sleeve and the outward engagement portion of the spring guide; and a spring member arranged in a cylindrical space formed between the large diameter sleeve and the spring guide to impart an elastic clamping force to the rolling bearing via the outward engagement portion.

As the damper sleeve structure is configured to impart an elastic clamping force to the rolling bearing by means of the spring member, it is possible to always maintain the clamping force to the rolling bearing with respect to positional change of the rolling bearing. Thus, it is possible to maintain the clamping force on the rolling bearing while allowing dimensional error of the rolling bearing and a mounting error of each member (the motor rotor, sleeve, etc.) fixed to the rotation shaft. As a result, it is possible to relax the allowable dimensional tolerance of each member and hence save the production cost of each member. Further, by using the damper sleeve structure having been integrally assembled in advance, assembly of the bearing mechanism is facilitated.

In the above electric supercharger, a spring member may be provided between the rolling bearing arranged on a compressor side and a spacer. When the supply air flows around the back face side of the compressor wheel, the supply air pressure is added to the back face side. As a result, in the axial direction of the rotation shaft, tensile force acting on the compressor side is generated. By providing the spring member between the rolling bearing arranged on the compressor side and the spacer, it is possible to elastically receive the tensile force. Therefore, it is possible to prevent generation of excessive load between the rolling bearing and the spacer and prevent damage to the rolling bearing and the spacer.

In the above electric supercharger, an intake passage may be connected to the compressor housing, and an intake air bypass passage configured so that intake air bypasses the compressor wheel and a bypass valve provided in the intake air bypass passage may be formed integrally in the compressor housing. As a result, it is no longer necessary to provide an intake bypass passage separately, and the electric supercharger becomes compact. Therefore, mounting of the electric supercharger to the vehicle is facilitated.

An internal combustion engine according to embodiments of the present invention comprises the electric supercharger described above, and the electric supercharger is provided in an intake passage. By incorporating the electric supercharger of the present invention into the internal combustion engine, it is possible to make the internal combustion engine compact and facilitate the mounting of the internal combustion engine to the vehicle. Further, with the compact internal combustion engine, it is possible to improve the fuel efficiency. Furthermore, it is possible to reduce the noise and vibration of the electric supercharger.

The internal combustion engine of the present invention may comprise: a turbocharger comprising a compressor provided on an upstream or downstream side of the intake passage with respect to the electric supercharger and a turbine provided in an exhaust passage; and an exhaust gas recirculation mechanism for returning a part of exhaust gas to the intake passage from the exhaust passage. In addition to the above-described effects, by combining the turbocharger and the electric supercharger of the present invention, it is possible to improve the output of the internal combustion engine and also improve responsiveness at the transient operation. Further, by providing the exhaust gas recirculation mechanism, it is possible to suppress generation of NOx in the exhaust gas.

Moreover, an assembling method of the electric supercharger of the present invention comprises: a first step of fitting a motor rotor to the rotation shaft from an end face of the rotation shaft that is on a motor inverter side and then fixing the motor rotor to an enlarged diameter part formed on the rotation shaft in a state where the motor rotor is engaged to the enlarged diameter part; a second step of fitting the rolling bearing to the rotation shaft from an end face of the rotation shaft that is on a compressor side and then fixing the rolling bearing to the enlarged diameter part in a state where the rolling bearing is engaged to the enlarged diameter part, and fitting the damper sleeve structure to the rotation shaft from the end face of the rotation shaft that is on the motor inverter side and then fixing the damper sleeve structure to the rotation shaft at a position adjacent to the motor rotor; a third step of fitting a bearing housing and the compressor wheel to the rotation shaft from the end of the rotation shaft that is on the compressor side, wherein the sleeve is provided on an inner surface of the bearing housing and a first damper mechanism is provided outside the sleeve, and then fixing the compressor wheel to the rotation shaft, and arranging the sleeve so that the gap is formed between the sleeve and an outer periphery of the rolling bearing; and a fourth step of, wherein a second damper mechanism is provided on an outer surface of an integrated housing which functions as housings for the electric motor and the inverter, covering a rotation shaft assembly unit from both sides with the compressor housing and the integrated housing, the rotation shaft assembly unit being assembled by performing the first to third steps, and joining the compressor housing and the integrated housing together in such a state that the bearing housing is clamped between the compressor housing and the integrated housing so that the second damper is arranged outside the large diameter sleeve.

According to the above assembling method of the present invention, by engaging the motor rotor and the rolling bearing to the enlarged diameter part formed on the rotation shaft from each side of the rotation shaft, positioning of the motor rotor and the rolling bearing is facilitated. Further, by prefabricating the damper sleeve structure and arranging the damper sleeve structure adjacent to the motor rotor, mounting of the bearing mechanism on the motor inverter side is facilitated. Furthermore, by fabricating the integrated housing serving as housings for the electric motor and the motor inverter and joining the compressor housing and the integrated housing together in such a state that the bearing housing is clamped between the compressor housing and the integrated housing, mounting of the electric supercharger housing can be completed in one step.

Thus, according to the assembling method of the present invention, it is possible to shorten the assembling process of the electric supercharger of the present invention which has the advantage of reducing vibration and other advantages, and facilitate assembling thereof.

Advantageous Effects

According to the electric supercharger of the present invention, the electric supercharger comprises: a compressor wheel housed in a compressor housing; an electric motor for driving a rotation shaft of the compressor wheel; a motor inverter for controlling rotation speed of the rotation shaft, the motor inverter being arranged adjacent to the electric motor in series on the rotation shaft; a rolling bearing provided on each side of the electric motor to rotatably support the rotation shaft; a sleeve provided outside the rolling bearing and forming a gap between the sleeve and the rolling bearing; a supporting portion clamping an outer ring or inner ring of the rolling bearing from both sides to support the rolling bearing; and a damper mechanism arranged outside the sleeve to elastically support the sleeve. Thus, it is possible to significantly reduce vibration of the electric motor and the motor inverter. In addition, as there is no generation of the eccentric load at the rotation shaft or the rolling bearing, it is possible to simplify and lower the cost of the configuration of the supercharger and also to suppress the reduction in the output of the rotation shaft. Further, against the thrust force added on the rotation shaft, it is possible to fix the rolling bearing in a stable fashion with respect to the thrust force added on the rotation shaft.

According to the internal combustion engine of the present invention, the electric supercharger of the present invention is provided in the intake passage and thus, it is possible to make the internal combustion engine compact. Thus, it is possible to improve the fuel efficiency and facilitate mounting to the vehicle. Furthermore, it is possible to reduce the noise and vibration of the electric supercharger.

According to the assembling method of the electric supercharger of the present invention, the assembling process includes the first step to the fourth step. Thus, the assembling process of the electric supercharger of the present invention can be shortened and facilitated.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

(First Embodiment)

Figure 1:
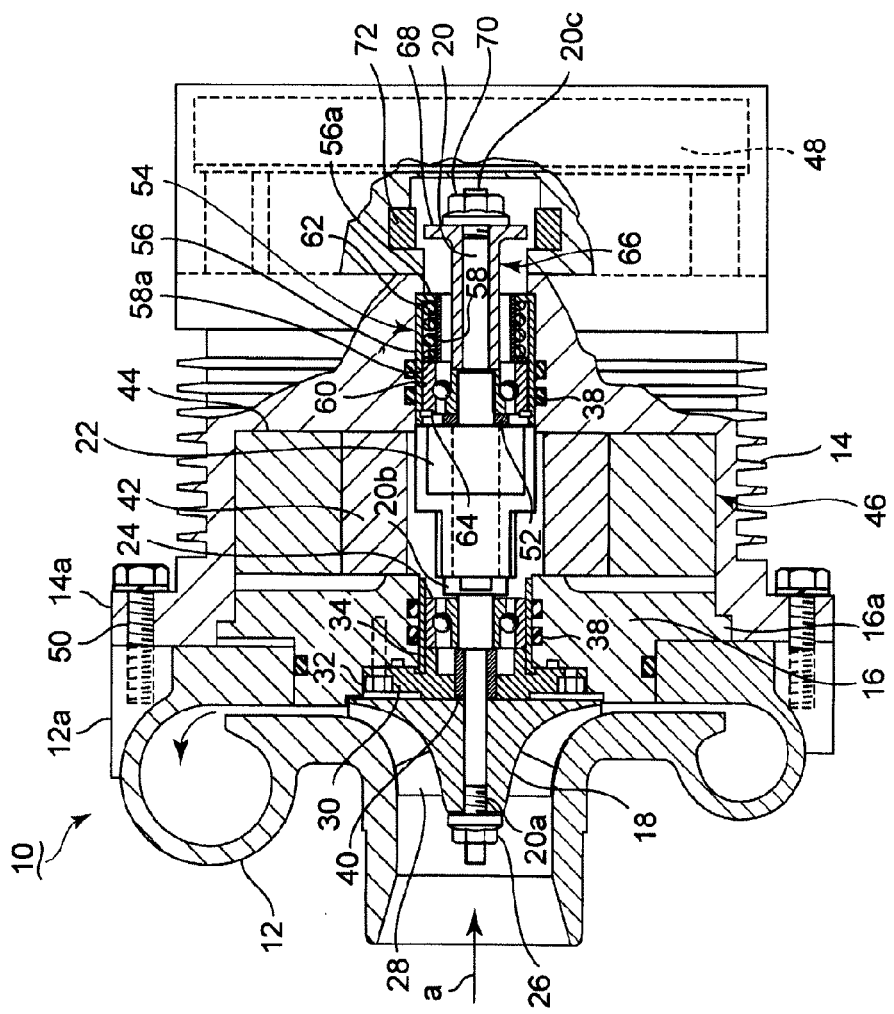
FIG. 1 is a sectional front view of an electric supercharger according to a first embodiment.
Figure 2:
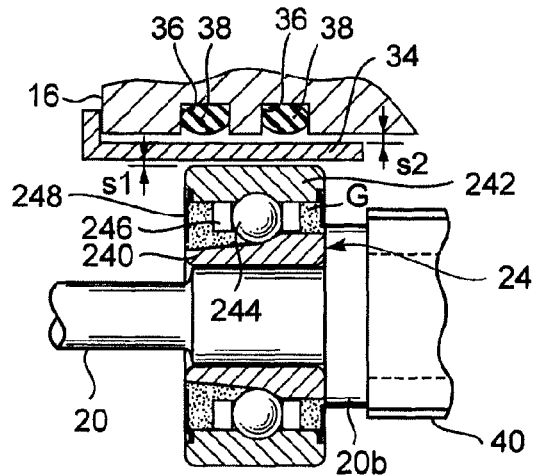
FIG. 2 is an enlarged sectional view of a part of a bearing mechanism for the electric supercharger.
Figure 3:
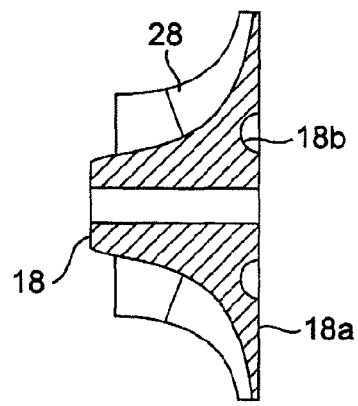
FIG. 3 is an enlarged sectional view of a part of a compressor wheel for the electric supercharger.

An electric supercharger according to a first embodiment of the present invention is described in reference to FIG. 1 to FIG. 3. The electric supercharger 10 of this embodiment is provided in an intake passage (not shown) of an internal combustion engine installed in a vehicle. A housing for the electric supercharger 10 is composed of a compressor housing 12, an integrated housing 14 functioning as a housing for an electric motor and a motor inverter, and a bearing housing 16. Inside the compressor housing 12, a compressor wheel 18 is housed. A through-hole is provided on an axial center line of the compressor wheel 18. An end of a rotation shaft 20 is fitted into the through-hole and a nut 26 is screwed to a screw portion 20a formed at the end of the rotation shaft 20 so as to join the compressor-side end of the rotation shaft 20 to the compressor wheel 18. The rotation shaft 20 is arranged on the axial center line of the compressor housing 12.

A plurality of impellers 28 projects radially from an outer peripheral surface of the compressor wheel 18. When the compressor wheel 18 rotates, supply air a is drawn from the intake passage, compressed and then supplied to an inlet manifold (not shown) of the internal combustion engine. In the compressor housing 12 and the integrated housing 14, flange portions 12a and 14a having flat faces abutting each other are formed. A flange portion 16a of the bearing housing 16 is clamped between the flange portions 12a and 14a, and the flange portions 12a and 14a are joined by bolts 50 so as to assemble all the housings of the electric supercharger 10 in one step.

An enlarged diameter part 20b of a disk shape is formed at a center of the rotation shaft 20. Inside the bearing housing 16, a ball bearing 24 which is one form of the rolling bearing is press-fit to the rotation shaft 20 at the position which contacts the enlarged diameter part 20b. The ball bearing 24 contains grease G packed therein and is provided with a seal member 248 for preventing grease leak (see FIG. 2). One side face of an inner ring 240 of the ball bearing 24 is in contact with the enlarged diameter part 20b. Between the ball bearing 24 and the compressor wheel 18, a sleeve 40 is provided and the other side face of the inner ring 240 is in contact with an end face of the sleeve 40. In this manner, both of the side faces of the inner ring 240 of the ball bearing 240 are clamped by the enlarged diameter part 20b and the sleeve 40.

A spacer 30 is joined to the bearing housing 16 by bolts 32. The spacer 30 is arranged between the compressor wheel 18 and the ball bearing 24, and a tip of the spacer 30 contacts a side face of an outer ring of the ball bearing 24 to support the ball bearing 24.

As illustrated in FIG. 2, a sleeve 34 is provided outside the ball bearing 24. A gap S1 is formed between the outer peripheral surface of the ball bearing 24 and an inner peripheral surface of the sleeve 34. The gap s1 is set to the minimum amount necessary for absorbing vibration of the rotation shaft 20 and thermal expansion at the maximum temperature of the ball bearing (e.g. 100° C.). Another gap s2 is formed between the sleeve 34 and an inner surface of the bearing housing 16. The gap s2 is set to the minimum amount necessary for elastically supporting the sleeve 34 by taking into account a safety factor based on a strain amount of an elastic O ring 38 calculated with respect to a load acting on the ball bearing 24, 60 due to vibration of the rotation shaft 20, and magnetic attraction on the rotation shaft 20.

On an inner surface of the bearing housing 16, two grooves 36 having a rectangular cross sectional shape are provided. In the grooves 36, elastic O rings 38 made of rubber are fitted. The elastic O rings 38 are arranged to fill the gap S2 and has elastic supporting action for elastically contacting the sleeve 34 to the inner surface of the bearing housing 16.

The ball bearing 24 comprises a spherical roller element 244 provided between the inner ring 240 and the outer ring 242, a retainer 246 for retaining the roller element 244, and a seal member 248 fixed to the outer ring 242 to enclose grease G. In such a state that a motor rotor 22 is in contact with the other side face of the enlarged diameter part 20b, the motor rotor 22 is press-fit to the rotations shaft 20. A motor coil 42 is arranged outside the motor rotor 22 with distance from the motor rotor 22. Outside the motor coil 42, a motor stator 44 is arranged.

The motor rotor 22, the motor coil 42 and the motor stator 44 configure the electric motor 46. The motor coil 42 and the motor stator 44 are accommodated in the integrated housing 14 which functions as housings for the electric motor 46 and the motor inverter 48.

Figure 7:
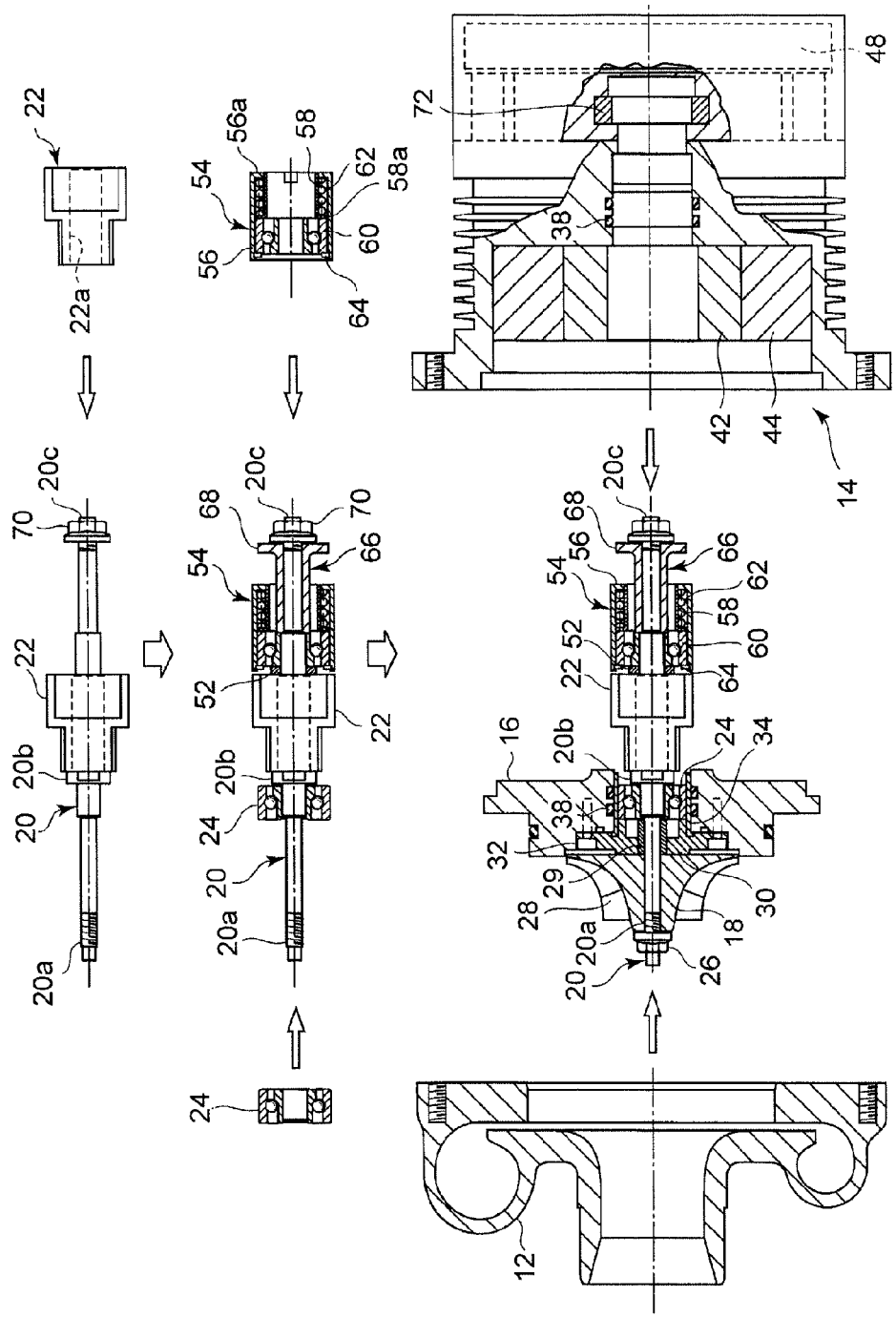
FIG. 7 is an assembly flow chart according to the first embodiment of the present invention.
Figure 8:
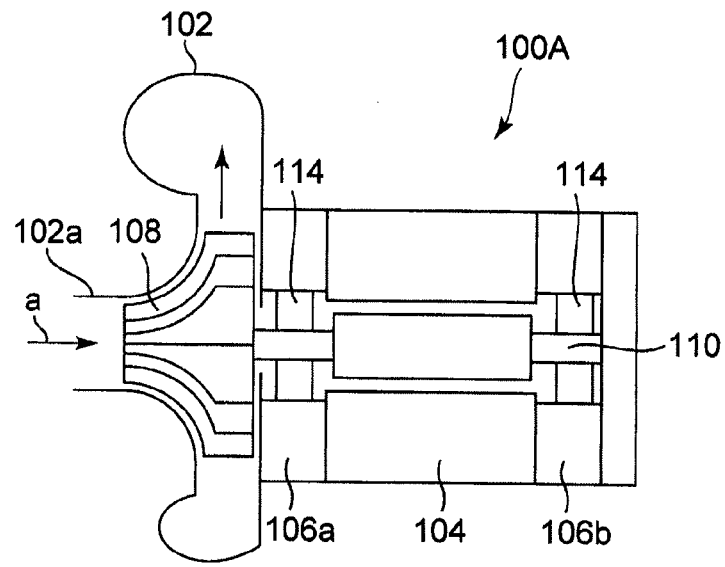
FIG. 8 is a sectional front view of an electric supercharger of a both end support type of the related art.
Figure 9:
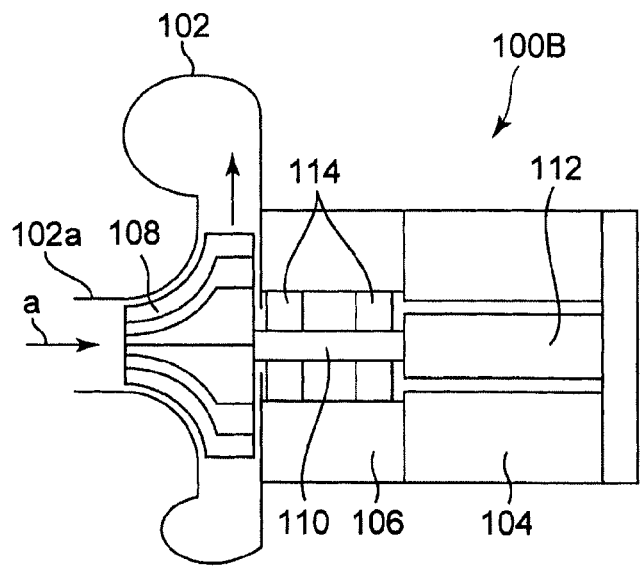
FIG. 9 is a sectional front view of an electric supercharger of a cantilever support type of the related art.

A damper sleeve structure 54 is arranged adjacent to the motor rotor 22 via a ring-shape spacer 52 having a rectangular cross-sectional shape. As illustrated in FIG. 7, the damper sleeve structure 54 is configured by a cylindrical large diameter sleeve 56, a cylindrical spring guide 58, a grease sealing type bearing 60 and a coil spring 62. On an inner peripheral face of one end of the large diameter sleeve 56, an inward engagement portion 56a of a ring shape is provided to project inward, and on an inner peripheral face of the outer end of the large diameter sleeve 56, a plurality of fixing pins 64 which projects inward is attached in the circumferential direction. At one end of the outer peripheral surface of the spring guide 58, an outward engagement portion 58a of a ring shape projects outward.

In a cylindrical space formed by the large diameter sleeve 56 and the spring guide 58, the coil spring 62 is housed. Between the fixing pins 64 and the outward engagement portion 58a, the outer ring 242 of the ball bearing 60 is fitted. In this manner, the outer ring 242 of the ball bearing 24 is clamped from both sides by the fixing pins 64 and the outward engagement portion 58a. To the outer ring 242 of the ball bearing 24, a spring force of the coil spring 62 is applied via the outward engagement portion 58a.

The gap s1 is formed between the outer peripheral surface of the outer ring 242 of the ball bearing and the inner surface of the large diameter sleeve 56. The gap s1 is set to the minimum amount necessary for absorbing vibration of the rotation shaft and thermal expansion at the maximum temperature of the ball bearing (e.g. 100° C.). The gap s2 is formed between the outer peripheral surface of the large diameter sleeve 56 and the inner peripheral surface of the integrated housing 14. On the inner surface of the integrated housing 14, as illustrated in FIG. 2, two grooves 36 having a rectangular cross sectional shape are provided. In the grooves 36, the elastic O rings 38 made of rubber are fitted. The elastic O rings 38 are arranged to fill the gap S2 and has elastic supporting action for bringing the sleeve 34 into elastic contact with the inner surface of the integrated housing 14.

Adjacent to the damper sleeve structure 54, a sleeve 66 is press-fitted to the rotation shaft 20. One end of the sleeve is in contact with a side face of the inner ring 240 of the ball bearing 60 to fix the ball bearing 60. At the other end of the sleeve 66, a sensor target 68 projects outward. At an inverter side end of the rotation shaft 20, a screw portion 20c is formed, to which a nut 70 is screwed. In the integrated housing 14, a motor inverter 48 is arranged adjacent to the electric motor 46. To the inner surface of the integrated housing 124, a rotation sensor 72 for detecting the rotation speed of the rotation shaft 20 is attached at a position that faces a sensor target 68.

According to this embodiment, by supporting the rotation shaft 20 by the grease sealing type bearings 24 and 60, it is no longer necessary to provide a lubricating oil supply means such as a lubricating oil supplying piping for supplying lubricating oil to the ball bearing. Therefore, it is possible to simplify the configuration of the electric supercharger 10 and lower the cost.

The electric motor 46 being heavy in weight is supported by the ball bearings 24 and 60 that are arranged at both ends of the electric motor 46 and thus, it is possible to reduce vibration of the rotation shaft 20. In addition to this, the inner or outer ring of the ball bearing 24 and 60 is clamped by a member arranged at its both ends, and the gap s1 for absorbing vibration of the rotation shaft 20 and thermal expansion of the ball bearing is formed between the sleeve 34 arranged outside the ball bearing 24, 60 and the large diameter sleeve 56 and thus, it is possible to effectively prevent vibration of the rotation shaft 20 from transmitting to the electric motor 46 and the motor inverter 48. Further, by forming the gap s1, it is possible to suppress uneven load generated at the rotation shaft 20 and the ball bearings 24 and 60 and thus to suppress reduction in the output of the rotation shaft 20.

By taking into account the magnetic attraction acting on the rotation shaft 20 and the load applied to the ball bearings 24, 60 by vibration of the rotation shaft 20, the gap s2 is formed between the sleeve 34 and the inner surface of the bearing housing 16 or between the large diameter sleeve 56 and the inner surface of the integrated housing 14 to elastically support the outer peripheral surface of the sleeve 34 or the large diameter sleeve 56 by the elastic O ring 38. As a result, it is possible to significantly reduce the vibration of the electric motor 46 and the motor inverter 48. Further, the inner or outer ring of the ball bearing 24, 60 is clamped by a member arranged at its both ends and thus, it is possible to receive the thrust force applied to the rotation shaft 20 from the compressor wheel 18, etc. using the ball bearing 24, 60 in a stable fashion. This contributes to reduction of the vibration. By significantly reducing vibration of the electric supercharger 10 in this manner, it is possible to significantly reduce the noise generated from the electric supercharger 10.

The integrated housing 14 is configured to house the electric motor 46 and the motor inverter 48, and the electric motor 46 and the motor inverter 48 are arranged adjacent to each other. Thus, current loss between the electric motor 46 and the motor inverter 48 can be minimized. As a result, the reduction of the motor output can be suppressed to the minimum.

Further, by providing the damper sleeve structure 54 in the integrated housing 14, the inner ring 240 and the outer ring 242 of the ball bearing 60 can be clamped at both sides thereof by the elastic force of the coil spring 62 while absorbing installation errors and dimension tolerance at each part in the axial direction of the rotation shaft 20. As a result, even when dimension tolerance or installation error occurs at each part, the ball bearing can be fixed in a stable fashion. Further, as the elastic O ring 38, it is preferable to use the one with hardness of at least 70 of JIS standard. Further, by setting the spring force applied to the ball bearing 60 by the coil spring 62 to 70 to 90N (newton), the ball bearing 60 can be fixed in a stable fashion.

Further, by changing the material, configuration or the like of the compressor wheel 18, it is possible to reduce an inertia moment, improve responsiveness at the transient operation, and reduce the vibration of the rotation shaft 20. For instance, instead of aluminum alloy which is normally used, magnesium, resin, etc. may be used so as to reduce the inertia moment. Further, as illustrated in FIG. 3, by configuring a back face 18a of the compressor wheel 18 to be a flat surface which is orthogonal to the rotation shaft 20, the overall length of the compressor wheel 18 can be reduced. Furthermore, by providing in the back face 18a a circular or oval groove 18b having half-moon or semicircular section, it is possible to reduce the compressor wheel 18 in weight.

When the supply air a enters the back face 18a of the compressor wheel 18, the supply air pressure is applied to the back face 18a and the tensile force acting toward the compressor side is generated in the axial direction of the rotation shaft 20. By this tensile force, an excessive load may be generated between the spacer 30 and the ball bearing 24. In view of this, in the first embodiment, a spring member such as a coil spring may be placed between the spacer 30 and the ball bearing 24. As a result, it is possible to prevent generation of the excessive load between the spacer 30 and the ball bearing 24 and prevent damage to the spacer 30 and the ball bearing 24.

(Second Embodiment)

Figure 4:
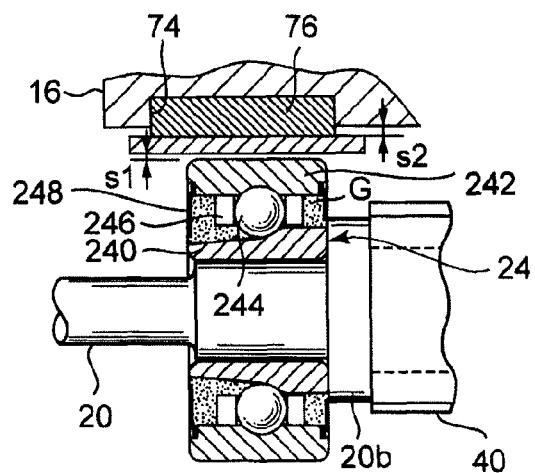
FIG. 4 is an enlarged sectional view of a part of the bearing mechanism according to a second embodiment for the electric supercharger.

Next, the electric supercharger according to a second embodiment of the present invention is described in reference to FIG. 4. In this embodiment, a groove 74 is provided on the inner surface of the bearing housing 16. The groove 74 has a rectangular cross section with width wider than the groove 36. In the groove 74, a flat rubber damper 76 which is wide and has a rectangular cross section is fitted to the groove 74. The second embodiment is substantially the same as the first embodiment except that the elastic damper 76 is in contact with the sleeve 34, and the gaps s1 and s2 are formed on both sides of the sleeve 34.

According to this embodiment, in addition to the effects obtained by the first embodiment, by providing one wide groove 74, it facilitates formation of the groove and also by providing the wide elastic damper 76, it enhances the elastic support function of the rotation shaft 20 and further reduces the vibration of the electric motor 46 and the motor inverter 48. Further, the elastic damper 76 may have wave-like shape. Alternatively, the elastic O ring or the elastic damper 76 may be of resin or metal material having unevenness (e.g. a tolerance ring).

As another alternative to the damper mechanism, it may be configured so that the lubricating oil is supplied to the gap s2 and an oil film is formed in the gap s2 to obtain the elastic supporting effect. According to the oil film formation method, it is not necessary to consider deterioration of the elastic damper and the elastic supporting effect can be maintained longer.

(Third Embodiment)

Figure 5:
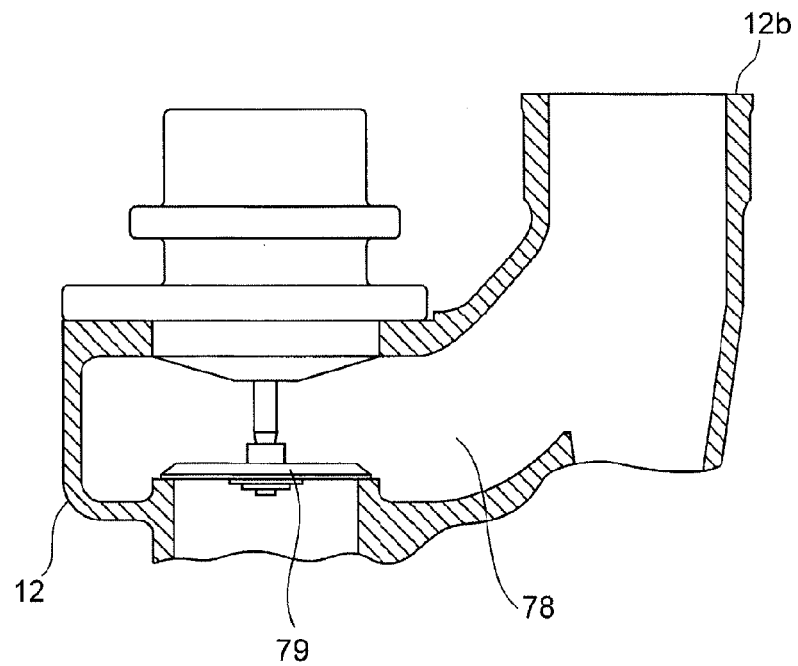
FIG. 5 is a sectional view of a part of a compressor housing according to a third embodiment for the electric supercharger.

Next, the electric supercharger according to a third embodiment of the present invention is described in reference to FIG. 5. This embodiment illustrates the exemplary case where a bypass passage is provided in the intake passage of the internal combustion engine, the bypass passage being configured so that the intake air bypasses the compressor wheel 18. The compressor housing 12 has an exhaust port 12b for the supply air a. Further, the bypass passage 78 is integrally formed in the compressor housing 12, and a bypass valve 79 is provided in the bypass passage 78.

According to this embodiment, it is no longer necessary to install the bypass pipe for the supply air a when installing the electric supercharger in the engine mounted on a vehicle. Therefore, it is possible to obtain the electric supercharger which is contact and it becomes easier to install the electric supercharger in the vehicle.

(Fourth Embodiment)

Figure 6:
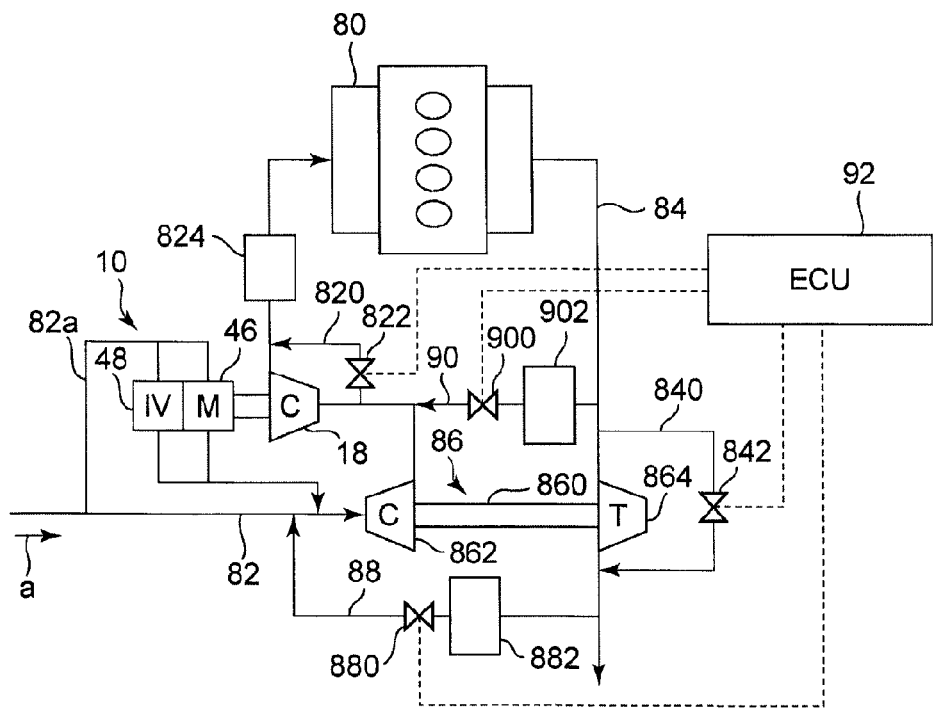
FIG. 6 is a system diagram of an internal combustion engine according to a first embodiment of the present invention.

Next, the internal combustion engine according to a fourth embodiment of the present invention is described in reference to FIG. 6. In FIG. 6, an intake passage 82 and an exhaust passage 84 are provided in an engine 80 mounted on the vehicle. The electric supercharger 10 is installed in the intake passage 82. A turbocharger 86 is provided astride the intake passage 82 and the exhaust passage 84. The turbocharger 86 comprises a compressor 862 provided on an upstream side of the electric supercharger 10 in the intake passage 82, a turbine 864 provided in the exhaust passage 84, and a rotation shaft 860 connecting the compressor 862 and the turbine 864.

In the intake passage 82, a bypass passage 820 for bypassing the compressor wheel 18 of the electric supercharger 10, a bypass valve 822 provided in the bypass passage 820, and an intercooler 824 provided on a downstream side of the compressor wheel 18 are provided. In the exhaust passage 84, a bypass passage 840 for bypassing the turbine 864 and a bypass valve 842 provided in the bypass passage 840 are provided.

Further, a low-pressure exhaust gas recirculation passage 88 is provided to connect a downstream section of the exhaust passage 84 which is downstream from the turbine 864 and an upstream section of the intake passage 82 which is upstream from the compressor 862. In the low pressure exhaust gas recirculation passage 88, a flow regulating valve 880 and an intercooler 882 are provided. Furthermore, a high-pressure exhaust gas recirculation passage 90 is provided to an upstream section of the exhaust passage 84 which is upstream from the turbine 864 and a downstream section of the intake passage 82 which is downstream from the compressor 862. In the high pressure exhaust gas recirculation passage 90, a flow regulating valve 900 and an intercooler 902 are provided.

Moreover, ECU (engine control unit) 02 is provided to control the opening degrees of the bypass valves 822, 864 and the opening degrees of the flow regulating valves 880, 900 and also to control operation of the engine 80. By controlling the opening degree of the bypass valve 822 or 864, it is possible to control the flow rate in the intake passage 82 or the exhaust passage 84. By controlling the opening degree of the flow regulating valve 880 or 900, it is possible to control the exhaust gas recirculation rate. The intake passage 82 splits upstream from the compressor 862. A branch passage 82a is installed in the electric motor 46 and the motor inverter 48 of the electric supercharger 10 to cool the electric motor 46 and the motor inverter 48. The branch passage 82a joins a downstream side of the intake passage 82 which is downstream from the electric motor 46 and the motor inverter 48.

In this embodiment, the supply air a supplied to the intake passage 82 is pressurized in two stages by the turbocharger 86 and the electric supercharger 10 and then supplied to the engine 80. To reduce NOx in the exhaust gas, a part of the exhaust gas is returned to the intake passage 82 from the low pressure exhaust gas recirculation passage 88 or the high pressure exhaust gas recirculation passage 90. Depending on the operating state, the ECU 92 controls the opening degrees of the bypass valve and the flow regulating valve. For instance, at the low load operation, the pressure of the exhaust gas exhausted to the exhaust passage 84 is low and thus, the exhaust gas is returned to the intake passage 82 through the low pressure exhaust gas recirculation passage 88. At the high load operation, the pressure of the exhaust gas exhausted to the exhaust passage 84 is high and thus, the exhaust gas is returned to the intake passage 82 through the high pressure exhaust gas recirculation passage 90.

At the transient operation for transition from the low load operation to the high load operation, a large amount of the exhaust gas is returned to the intake passage 82 mainly from the low pressure exhaust gas recirculation passage 88 and is supercharged at high pressure by the electric supercharger 10 to suppress deterioration of fuel consumption and reduce the NOx amount in the exhaust gas.

According this embodiment, by returning the exhaust gas to the intake passage 82 from the low pressure exhaust gas recirculation passage 88 and the high pressure exhaust gas recirculation passage 90, it is possible to reduce the amount of NOx in the exhaust gas. Further, by arranging the turbocharger 86 and the electric supercharger 10 in two stages in the intake passage 82, it is possible to increase the output of the engine 80. This makes it possible to downsize the engine 80, which results in enhanced fuel efficiency and improved responsiveness at the transient operation.

Moreover, in this embodiment, only one of the low pressure exhaust gas recirculation passage 88 or the high pressure exhaust gas recirculation passage 90 may be provided.

(Fifth Embodiment)

Next, a method according to a fifth embodiment of the present invention is described in reference to FIG. 7. The enlarged diameter part 20b is formed at the center of the rotation shaft 20, and a through hole 22a is formed in the center of the motor rotor 22 in the axial direction. First, the motor rotor 22 is inserted from the inverter side end of the rotation shaft 20, and then fixed to the rotation shaft 20 in such a state that a small diameter end face is contact with the enlarged diameter part 20b, by cooling fitting, press-fitting or the like. Next, the ball bearing 24 is inserted from the compressor end of the rotation shaft 20 and then fixed to the rotation shaft 20 in such a state that the ball bearing 24 is in contact with the enlarged diameter part 20b, by cooling fitting, press-fitting or the like.

Next, the spacer 52 having a rectangular cross section and the damper sleeve structure 54 are inserted from the inverter side end of the rotation shaft 20. The damper sleeve structure 54 is configured so that the large diameter sleeve 56, the small diameter spring guide 58, the ball bearing 60 and the coil spring 62 are integrally formed with the fixing pins 64. The spacer 52 is interposed between the motor rotor 22 and the damper sleeve structure 54. In such a state that the spacer 52, the motor rotor 22 and the damper sleeve structure 54 are in contact, the ball bearing 24 is fixed to the rotation shaft 20 by cold fitting, press-fitting or the like. Next, the sleeve 66 having the sensor target 68 is mounted on the rotation shaft 20 and then the nut 70 is screwed to the screw part 20c.

Next, the bearing housing 16 and the compressor wheel 18 are mounted to the rotation shaft 20 in this order, and the nut 26 is screwed to the screw part 20c. In the bearing housing 16, the elastic O ring 38, the sleeve 34 and the spacer 30 are joined together in advance by the bolts 32. The elastic O ring 38 and the sleeve 34 are arranged such as to form the gap s1 on the outer circumferential side of the ball bearing 24. Further, the gap s2 is formed between the inner surface of the bearing housing 16 and the sleeve 34. The inner ring of the ball bearing 24 is clamped by the spacer 52 and the sleeve 66 from both sides.

Next, to the rotation shaft assembly structure which is assembled in the above manner, the compressor housing 23 and the integrated housing 14 are mounted from both sides. The flange portion 16a of the bearing housing 16 is inter posed between the flange portions 12a of the compressor housing 12 and the flange portion 14a of the integrated housing 14 which face each other, and the flange portion 12a and the flange portion 14a are joined together by the bolts 50.

According to this embodiment, the motor rotor 22 and the ball bearing 24 are retained from both sides by the enlarged diameter part 20b formed on the rotation shaft 20. This facilitates positioning of the motor rotor 22 and the ball bearing 24. Further, the damper sleeve structure 54 is prepared in advance and then arranged adjacent to the motor rotor 22. This facilitates mounting of the bearing mechanism on the motor inverter side. Further, the integrated housing 14 functioning as the housing for the electric motor 46 and the motor inverter 48 is manufactured, and the compressor housing 12 and the integrated housing 14 are joined together by clamping the flange portion of the bearing housing 16 by the flange portions of the compressor housing 12 and the integrated housing 14 and joining the flange portions by the bolts 50. In this manner, assembling of the housings for the electric supercharger can be completed in one step.

As described above, according to this embodiment, it is possible to shorten the assembly process of the electric supercharger 10 which is advantageous in reducing the vibration, etc, and also to facilitate the assembly.

INDUSTRIAL APPLICABILITY

According to the present invention, it is possible to realize an electric supercharger which is compact and easy to install and is capable of reducing vibration and noise. Further, by installing the electric supercharger in the internal combustion engine, it is possible to make the internal combustion engine compact and facilitates installation of the internal combustion engine to the vehicle.

REFERENCE SIGNS LIST 10, 100A, 110B Electric supercharger
12, 102 Compressor housing
12a, 14a, 16a Flange portion
14 Integrated housing
16, 106, 106a, 106b Bearing housing
18, 108 Compressor wheel
20, 110 Rotation shaft
20b Enlarged diameter part
22, 112 Motor rotor
24, 60 Ball bearing
240 Inner ring
242 Outer ring
244 Roller element
246 Retainer
248 Seal member
26, 70 Nut
28 Impeller
30, 52 Spacer
32, 50 Bolt
34, 40, 66 Sleeve
36, 74 Groove
38 Elastic O ring
42 Motor coil
44 Motor stator
46 Electric motor
48 Motor inverter
54 Damper sleeve structure
56 Large diameter sleeve
56a Inward engagement portion
58 Spring guide
58a Outward engagement portion
62 Coil spring
64 Fixing pin
68 Sensor target
72 Rotation sensor
76 Elastic damper
78 Bypass passage
79 Bypass valve
80 Engine
82 Intake passage
84 Exhaust passage
86 Turbocharger
88 Low pressure exhaust gas recirculation passage
90 High pressure exhaust gas recirculation passage
92 ECU
104 Motor housing
114 Bearing
G Grease
a Supply air
s1, s2 Gap

The invention claimed is:

1. An electric supercharger comprising:
a compressor wheel housed in a compressor housing;
an electric motor for driving a rotation shaft of the compressor wheel;
a motor inverter for controlling rotation speed of the rotation shaft;
a first rolling bearing arranged on a compressor wheel side of the electric motor to rotatably support the rotation shaft;
a second rolling bearing arranged on a motor invertor side of the electric motor to rotatably support the rotation shaft,
the electric supercharger further comprising:
a first sleeve provided outside an outer periphery of the first rolling bearing;
a bearing support clamping an outer ring or inner ring of the first rolling bearing from both sides of the first rolling bearing along the rotation shaft to support the first rolling bearing, the bearing support including:
a first clamp having an enlarged diameter relative to a diameter of the rotation shaft and provided on the rotation shaft so as to contact one side surface of an outer ring or inner ring of the first rolling bearing; and
a second clamp having an enlarged diameter relative to a diameter of the rotation shaft and provided on the rotation shaft so as to contact another side surface of the outer ring or inner ring of the first rolling bearing; and
a damper mechanism arranged outside the first sleeve to elastically support the first sleeve,
wherein
the motor inverter is arranged adjacent to the electric motor in series on the rotation shaft,
a first gap is formed between the first sleeve and the outer periphery of the first rolling bearing.

2. The electric supercharger according to claim 1, wherein each of the first rolling bearing and the second rolling bearing comprises a grease enclosed rolling bearing.

3. The electric supercharger according to claim 1, wherein the damper mechanism comprises a damper member having elasticity, the damper member being provided in a second gap, the second gap being formed between the first sleeve and an inner surface of a housing facing the first sleeve.

4. The electric supercharger according to claim 1, wherein the damper mechanism is configured so that an oil film of lubricating oil is formed in a second gap, the second gap being formed between the first sleeve and an inner surface of a housing facing the first sleeve.

5. The electric supercharger according to claim 1, further comprising
a damper sleeve structure including the second rolling bearing,
wherein the damper sleeve structure comprises:
a large diameter sleeve having a pair of inward engagement portions which projects inwardly at each ends;
a cylindrical spring guide provided inside the large diameter sleeve and having an outward engagement portion which projects outward at one end;
the second rolling bearing arranged inside the larger diameter sleeve and forming a second gap between the larger diameter sleeve and the second rolling bearing,
the second rolling bearing being clamped between one of the inward engagement portions of the large diameter sleeve and the outward engagement portion of the spring guide; and
a spring member arranged in a cylindrical space formed between the large diameter sleeve and the spring guide to impart an elastic clamping force to the second rolling bearing via the outward engagement portion.

6. An assembling method of the electric supercharger of claim 5, comprising:
- a first step of fitting a motor rotor to the rotation shaft from an end face of the rotation shaft that is on a motor inverter side and then fixing the motor rotor to an enlarged diameter part formed on the rotation shaft in a state where the motor rotor is engaged to the enlarged diameter part;
- a second step of fitting the first rolling bearing to the rotation shaft from an end face of the rotation shaft that is on a compressor side and then fixing the first rolling bearing to the enlarged diameter part in a state where the first rolling bearing is engaged to the enlarged diameter part, and fitting the damper sleeve structure to the rotation shaft from the end face of the rotation shaft that is on the motor inverter side and then fixing the damper sleeve structure to the rotation shaft at a position adjacent to the motor rotor;
- a third step of fitting a bearing housing and the compressor wheel to the rotation shaft from the end of the rotation shaft that is on the compressor side, wherein the first sleeve is provided on an inner surface of the bearing housing and a first damper mechanism is provided outside the first sleeve, and then fixing the compressor wheel to the rotation shaft, and arranging the first sleeve so that the first gap is formed between the first sleeve and an outer periphery of the first rolling bearing; and
- a fourth step of, wherein a second damper mechanism is provided on an outer surface of an integrated housing which functions as housings for the electric motor and the inverter, covering a rotation shaft assembly unit from both sides with the compressor housing and the integrated housing, the rotation shaft assembly unit being assembled by performing the first to third steps, and joining the compressor housing and the integrated housing together in such a state that the bearing housing is clamped between the compressor housing and the integrated housing so that the second damper is arranged outside the large diameter sleeve.

7. The electric supercharger according to claim 1, wherein a spring member is provided between the first rolling bearing and a spacer.

8. The electric supercharger according to claim 1, wherein an intake passage is connected to the compressor housing, and an intake air bypass passage configured so that intake air bypasses the compressor wheel and a bypass valve provided in the intake air bypass passage are formed integrally in the compressor housing.

9. An internal combustion engine comprising the electric supercharger of claim 1, wherein the electric supercharger is provided in an intake passage.

10. The internal combustion engine according to claim 9, comprising:
- a turbocharger comprising a compressor provided on an upstream or downstream side of the intake passage with respect to the electric supercharger and a turbine provided in an exhaust passage; and
- an exhaust gas recirculation mechanism for returning a part of exhaust gas to the intake passage from the exhaust passage,
- wherein the exhaust gas recirculation mechanism has at least one of:
- a low pressure exhaust gas recirculation passage connected to a downstream section of the exhaust passage which is downstream from the turbine and an upstream section of the intake passage which is upstream from the compressor; and
- a high pressure exhaust gas recirculation passage connected to an upstream section of the exhaust passage which is upstream from the turbine, an upstream section of the intake passage which is upstream from the compressor wheel and a downstream section of the intake passage which is downstream from the compressor.

* * * * *